United States Patent
Shimada

(10) Patent No.: US 6,697,965 B1
(45) Date of Patent: Feb. 24, 2004

(54) PROGRAM VERIFYING METHOD AND SYSTEM

(75) Inventor: Fumio Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 437 days.

(21) Appl. No.: 09/593,423

(22) Filed: Jun. 14, 2000

(30) Foreign Application Priority Data

Jul. 10, 1999 (JP) .......................................... 11-286566

(51) Int. Cl.⁷ ............................................... G06F 11/00
(52) U.S. Cl. ........................... 714/38; 714/33; 717/124; 717/126
(58) Field of Search ...................... 714/38, 33; 717/124, 717/126

(56) References Cited

U.S. PATENT DOCUMENTS

| | | | | |
|---|---|---|---|---|
| 5,721,926 A | * | 2/1998 | Tamura | 717/104 |
| 5,828,829 A | * | 10/1998 | Yamauchi et al. | 714/38 |
| 6,336,212 B1 | * | 1/2002 | Gray et al. | 717/124 |
| 6,378,087 B1 | * | 4/2002 | Flanagan et al. | 714/38 |
| 6,378,088 B1 | * | 4/2002 | Mongan | 714/39 |
| 6,385,741 B1 | * | 5/2002 | Nakamura | 714/38 |
| 6,415,396 B1 | * | 7/2002 | Singh et al. | 714/38 |
| 6,421,634 B1 | * | 7/2002 | Dearth et al. | 703/14 |
| 6,427,000 B1 | * | 7/2002 | Mumford et al. | 379/9 |
| 6,449,711 B1 | * | 9/2002 | Week | 712/223 |
| 6,513,133 B1 | * | 1/2003 | Campbell | 714/38 |

* cited by examiner

*Primary Examiner*—Scott Baderman
*Assistant Examiner*—Anne L. Damiano
(74) *Attorney, Agent, or Firm*—Staas & Halsey LLP

(57) ABSTRACT

A program development support system scans a program beforehand, extracts an essential process specification that should be actualized by an individual program and automatically extracts a part of the program that is not coincident with the process specification. A method of verifying an execution program executed by a computer for generating the execution program into blocks each including one or more processes and defined as a part of the program, which correspond to a verifying specification for verifying the program, generating a plurality of combinations of the two or more blocks as check route corresponding to the verifying the specification, and extracting the process corresponding to the verifying specification executed in a predetermined number or greater number of check routes, as a process specification that should be executed also in other check route.

9 Claims, 15 Drawing Sheets

FIG. 6

| DATA INDICATING FUNCTION |
|---|
| FILE NAME |
| ROW NUMBER |
| POINTER TO BLOCK STRUCTURE |

FIG. 7

CASE OF if(a)then{b}else{c}

| DATA GIVING INDICATION OF BEING if-STATEMENT |
|---|
| POINTER TO BLOCK STRUCTURE CORRESPONDING TO BLOCK a |
| ⋯ POINTER TO BLOCK STRUCTURE CORRESPONDING TO BLOCK b |
| ⋯ POINTER TO BLOCK STRUCTURE CORRESPONDING TO BLOCK c |

FIG. 8

CASE OF while(a){b}

| DATA GIVING INDICATION OF BEING while-STATEMENT |
|---|
| POINTER TO BLOCK STRUCTURE CORRESPONDING TO BLOCK a |
| POINTER TO BLOCK STRUCTURE CORRESPONDING TO BLOCK a |

FIG.14

```
                                        PROGRAM1
int sub1 (bufp. ctlp)(
struct buf *bufp;
struct ctl *ctlp;
    struct buf *buf2p a1
    if ( ┌ (buf2p=getbuf 0)<0 ┐ ) {
         └ ─ ─ ─ ─ ─ ─ ─ ─ ─ ┘

A1
        ┌ ─ ─ ─ ─ ─ ─ ─ ┐
        ¦ return(buf2p) ¦     /* FAILURE OF BUFFER ACQUISITION */
    }   └ ─ ─ ─ ─ ─ ─ ─ ┘
          b1
    if ( ┌ bufp->sts == DATA ┐ ) (
         └ ─ ─ ─ ─ ─ ─ ─ ─ ─ ┘

B1
        ┌ ─ ─ ─ ─ ─ ─ ─ ─ ─ ─ ┐
        ¦ buf2p->sts = DATA   ¦   /* NOTIFY OF RECEIVING DATA */
        ¦ buf2p->datap = bufp ¦
        ¦ sndmsg(buf2p, ctlp) ¦   /* NOTIFY TO THE HIGH-ORDER */
        └ ─ ─ ─ ─ ─ ─ ─ ─ ─ ─ ┘
                 B2
        ┌ ─ ─ ─ ─ ─ ─ ─ ─ ─ ─ ─ ─ ─ ─ ─ ─ ─ ─ ─ ─ ─ ┐
        ¦           c1                              ¦
    } else ¦ if ( ┌ bufp->sts == HD_ERR ┐ )  {      ¦
        ¦        └ ─ ─ ─ ─ ─ ─ ─ ─ ─ ─ ┘            ¦
        ¦    C1                                     ¦
        ¦ ┌ ─ ─ ─ ─ ─ ─ ─ ─ ─ ─ ┐                   ¦
        ¦ ¦ bup2p->sts = HD_ERR ¦        /* NOTIFY OF RECEIVING DATA */
        ¦ ¦ buf2p->datap = bufp ¦                   ¦
        ¦ ¦ sndasg(buf2p, ctlp) ¦        /* NOTIFY THE HIGH-ORDER */
        ¦ └ ─ ─ ─ ─ ─ ─ ─ ─ ─ ─ ┘                   ¦
        ¦ } else {                                  ¦
        ¦    C2                                     ¦
        ¦ ┌ ─ ─ ─ ─ ─ ─ ┐                           ¦
        ¦ ¦ relbuf(buf2p) ¦              /* RELEASE OF BUFFER */
        ¦ }└ ─ ─ ─ ─ ─ ─ ┘                          ¦
        └ ─ ─ ─ ─ ─ ─ ─ ─ ─ ─ ─ ─ ─ ─ ─ ─ ─ ─ ─ ─ ─ ┘
    return(NORMAL)
}
```

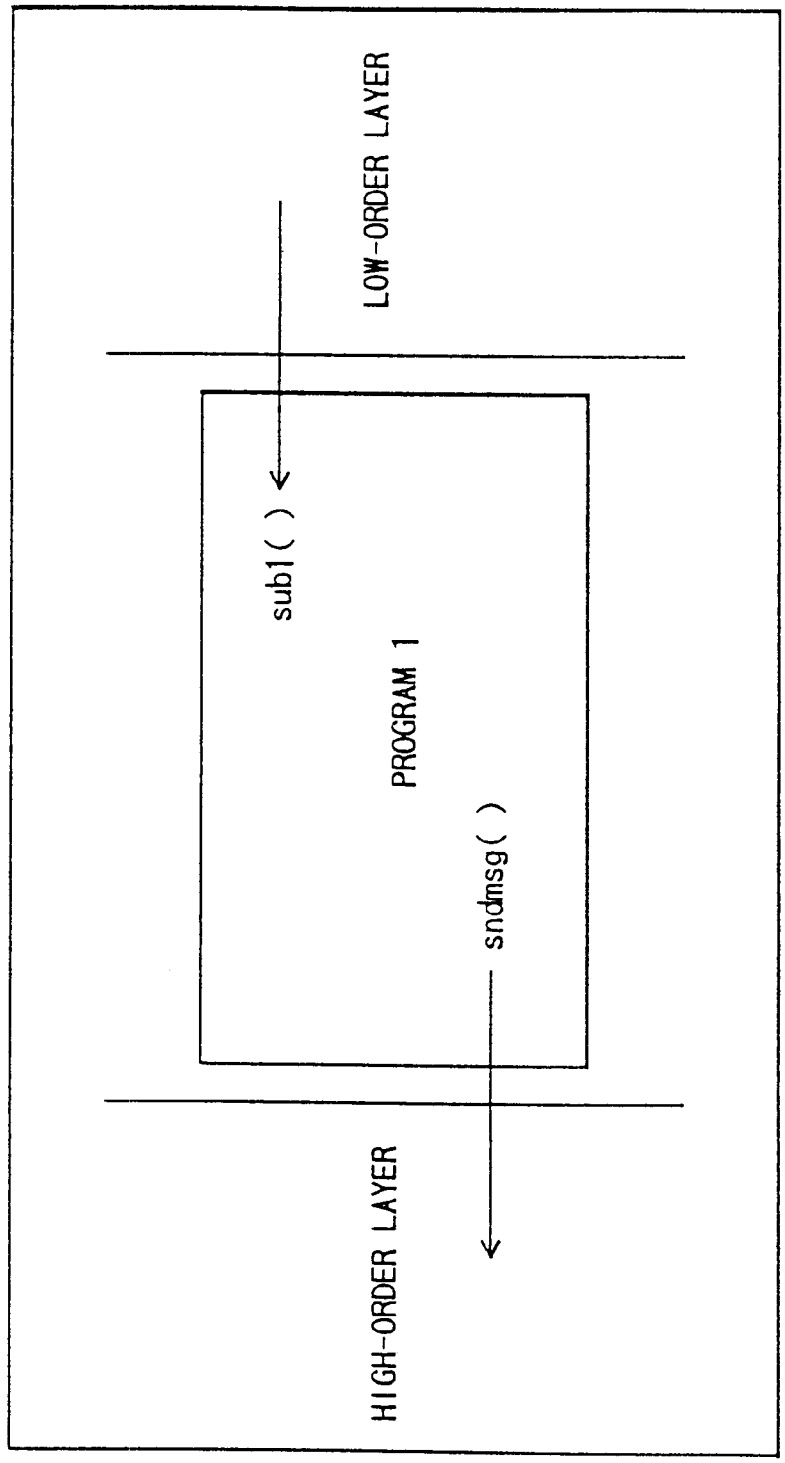

FIG.16

CHECK ROUTE AND ACQUISITION/RELEASE PATTERN

| | CHECK ROUTE | ACQUISITION PATTERN | RELEASE PATTERN |
|---|---|---|---|
| 1 | a1 — A1 | bufp, ct1p(NOTE), buf2p | buf2p |
| 2 | a1-b1 — B1 | bufp, ct1p(NOTE), buf2p | bufp, ct1p, buf2p |
| 3 | a1-b1 — B2-c1 — C1 | bufp, ct1p(NOTE), buf2p | bufp, ct1p, buf2p |
| 4 | a1-b1 — B2-c1 — C2 | bufp, ct1p(NOTE), buf2p | buf2p |

NOTE): bufp, ct1p ARE PARAMETERS OF FUCTION AND THEREFORE ALWAYS INCLUDED IN ACQUISITION PATTERN

PROGRAM VERIFYING METHOD AND SYSTEM

BACKGROUND OF THE INVENTION

The present invention relates generally to a technology supporting a program development, and more particularly to a verifying method and a verifying system suitable for detecting a fault of a program so called a bug.

The following two technologies may be typical examples of this type of system for verifying an operation of the program. One technology is a system that verifies the program by actually running the program. This system checks whether or not there is a program operation that might become a factor of fault such as an illicit access to a memory area and so on during the operation of the program.

According to another technology, this kind of verification is carried out before executing the program. This verifying system checks whether or not a description of the program accords with the syntax of a predetermined program language as done by a lint command in, e.g., a UNIX operating system.

The conventional technologies described above, however, have the following problems. That is, according to the method of verifying the program by actually running the program, verifying targets are not all the steps but only steps of the program which have actually been executed. Besides, it is difficult to verify the program with respect to all of combinations of branch conditions. Further, test data for verifying the program are normally manually prepared, and therefore an artificial mistake such as an omission of checking an important portion is easy to induce.

Moreover, even if a verified result is normal in verification as to whether or not the program accords with the syntax of the program language, this result is nothing but to verify that the source program is described based on the predetermined syntax. Namely, it is not checked whether the program operation is normal or not.

What is examined under such circumstances is a system for storing a computer with a request specification of each individual program and automatically checking whether or not this specification properly reflects in the program. The request specification, however, depends on an applied field at which the individual program aims and on functions that should be actualized, and it has been therefore considered difficult to develop a general-purpose program verifying system.

SUMMARY OF THE INVENTION

It is a primary object of the present invention to provide a method of and a system for automatically verifying a request specification of a program by a computer, and a general-purpose program verifying technology capable of obviating the problems inherent in the prior art described above.

Namely, according to the present invention, common portions of particular specifications possessed by the respective programs are previously prescribed as a verifying specification. Then, the present invention obviates the above problems by automatically extracting particular specifications (process specifications) possessed by the respective programs which correspond to the verifying specification.

To accomplish the above object of the present invention, according to one aspect of the present invention, a method of verifying an execution program executed by a computer or a source program for generating the execution program, comprises an operation of segmenting the execution program or the source program into blocks each consisting of one or more processes and defined as a part of the program, which correspond to a verifying specification for verifying the program, an operation of generating a plurality of combinations of the two or more blocks as a check route corresponding to the verifying specification, and an operation of extracting the processes corresponding to the verifying specification executed in a predetermined number or greater number of check routes, as a process specification that should be executed also in other check routes, thereby verifying the program.

The verifying method may further comprise an operation of detecting a fault of the program by inspecting a check route in which the processes extracted as the process specification are not executed.

The verifying method may further comprise an operation of displaying the blocks, the check routes and the processes extracted as the process specification or the processes which are not extracted as the process specification.

The verifying method may further comprise an operation of inputting information on the processes constituting a part or the whole of the process specification, as auxiliary information.

Next, the system according to the present invention will be explained in comparison with the prior art system. FIG. 1 is a conceptual diagram for comparing a system architecture of the present invention with the prior art system architecture.

Herein, examples A and B of the verifying specification are given as below. Further, corresponding process specifications a1, a2 and b1, b2 are also exemplified.

Example A: When dealing with a specified program resource in one single function, a process to be paired is needed.

Process specification a1: Processes to be paired, which corresponds to acquisition/release of a data buffer exist within one function.

Process specification a2: When operating an execution level (a degree of priority compared with other programs when executing the program) within one single function, a process of raising the execution level and a process of lowering the execution level are paired and exist in this form.

Verifying specification B: When the function is called, parameter elements that must be set are predetermined.

Process specification b1: When a function 1 is called, parameter elements 1, 2, 3, . . . must have been set.

Process specification b2: When a function 2 is called, parameter elements a, b, c, . . . must have been set.

As can be understood from FIG. 1, it is required in the prior art that input values based on individual process specifications be prepared as test data, or the process specifications be held beforehand inside the verifying system.

By contrast, according to the present invention, what is more general-purposed as a specification that should be checked, is previously prepared. Then, the verifying system itself automatically extracts a particular specification from a result of comparisons in a plurality of check routes. Accordingly, it is feasible to provide a more general-purposed system than by the prior art.

As described above, according to the present invention, an execution program executed by a computer or a source program for generating the execution program is segmented into blocks each consisting of one or more processes and defined as a part of the program, which correspond to a verifying specification. A plurality of combinations of the two or more blocks are generated as a check route corresponding to the verifying specification, and the processes corresponding to the verifying specification executed in a predetermined number or greater number of check routes are extracted as a process specification that should be executed also in other check routes, thereby verifying the program. Therefore, the process specification that should be essentially actualized by the individual program is extracted, and a part of the program which does not accord with the process specification, can be automatically extracted.

BRIEF DESCRIPTION OF THE DRAWINGS

FIG. 6 is a diagram showing an example 1 of the statement structure;

FIG. 7 is a diagram showing an example 2 of the statement structure;

FIG. 8 is a diagram showing an example 3 of the statement structure;

FIG. 14 is a diagram showing a sample program 1;

FIG. 15 is a diagram showing the sample program 1;

FIG. 16 is a diagram showing an example where an acquisition pattern and a release pattern are extracted from the check route.

DETAILED DESCRIPTION OF THE PREFERRED EMBODIMENT

An embodiment of the present invention will hereinafter be described with reference to FIGS. 2 through 17.

Architecture

Figure 1:
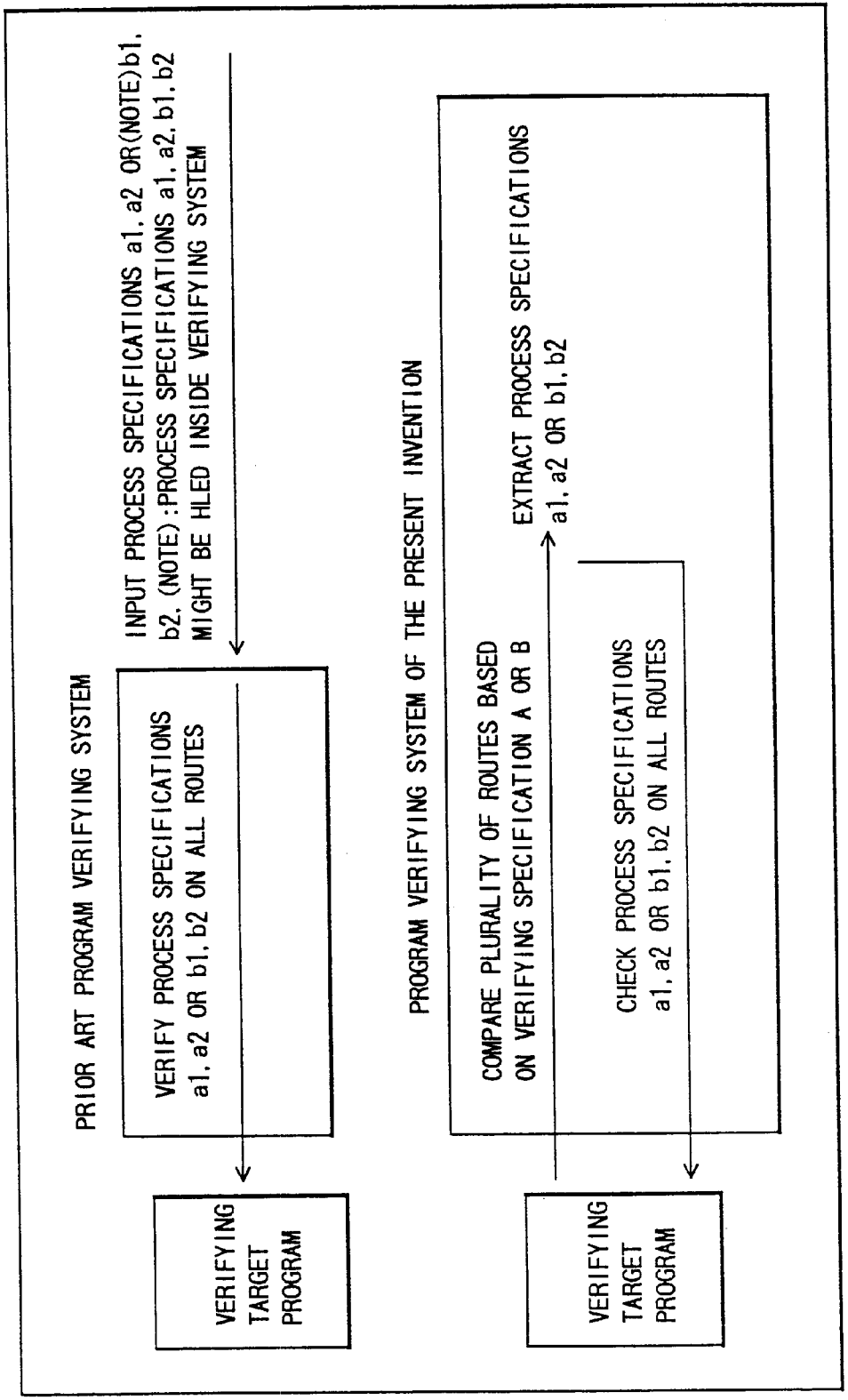
FIG. 1 is a diagram showing a concept of the present invention.
Figure 2:
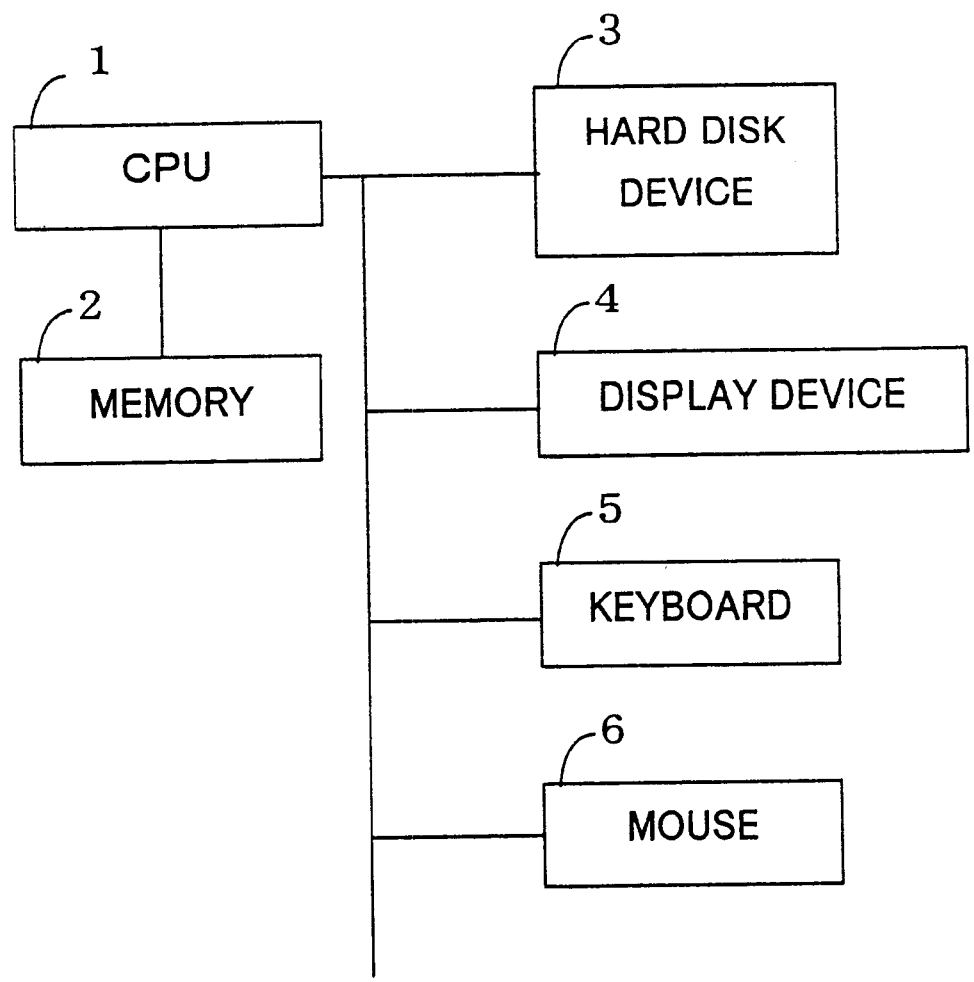
FIG. 2 is a diagram showing a hardware architecture in an embodiment of the present invention.

FIG. 2 is a diagram showing a hardware architecture of a program verifying system in the embodiment of the present invention. As shown in FIG. 2, this program verifying system includes a CPU 1, a memory 2, a hard disk device 3, a display device 4, a keyboard 5 and a mouse 6.

Figure 3:
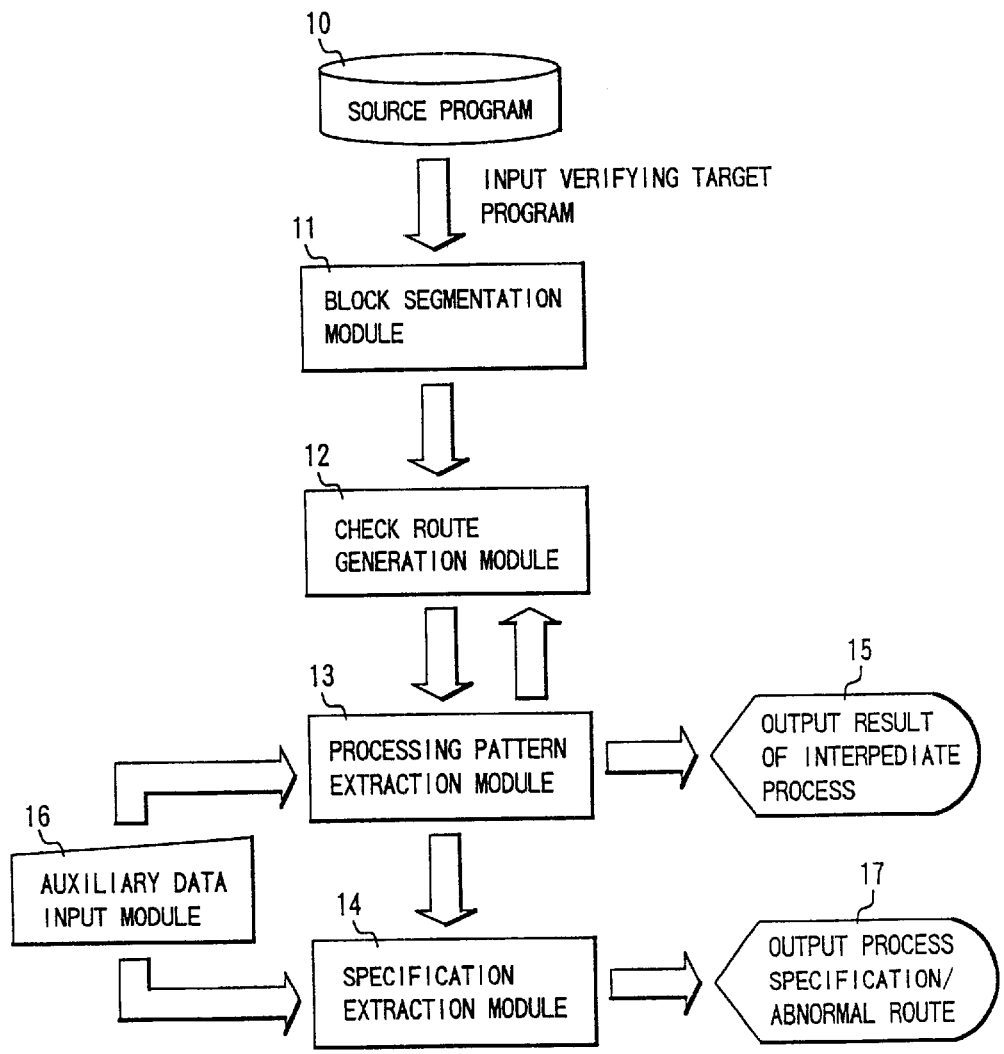
FIG. 3 is a diagram showing a program architecture in the embodiment of the present invention.

FIG. 3 is a diagram showing a structure of a program executed by the CPU 1 incorporated into the program verifying system in the present embodiment. This program has a block segmentation module 11 for segmenting the program to be verified into blocks, an check route generation module 12 for generating a check route defined as a set of statements (commands) consecutively executed in away of combining two or more blocks, and aprocessing pattern extraction module 13 for extracting a statement (which is hereinafter referred to as a processing pattern) for executing a specified process out of the extracted check route. The same program further has a process specification extraction module 14 for extracting a process specification as processes that should be essentially executed in comparison with the processing pattern extracted in a plurality of check routes, and an assisting information input module 16 for inputting information for assisting the verification.

Processing of Block Segmentation Module 11

The block segmentation module 11 analyzes a program hierarchical structure from a branch statement (branch command) and a function calling statement which is contained in a source program to be processed. The branch statement may be conceived as a statement for changing a program execution sequence in accordance with a designated condition or unconditionally. For example, an if-statement, a while-statement or a case-statement may be given as branch statements. On the other hand, the function calling statement is a statement for calling a function as a part of the program. The function is also called a subroutine. Further, the function calling statement is further known as a subroutine calling statement.

A range defined by a delimiter such as '{' and '}' or '{' and '}' in the definition of the function or the branch statement, contains a plurality of statements as a combination of statements as well as a single statement. Therefore, the range defined by the delimiter such as '{' and '}' or '{' and '}' is referred to as a block in this embodiment. Further, the block is constructed without using the delimiter such as '{' and '}' or '{' and '}', depending on programming languages. This may be a case where, for instance, a branch label serves as a header of the block. This may also be a case where key words such as 'IF', 'THEN', 'ELSE' OR 'ENDIF' as in the case of 'IF A THEN B ELSE C ENDIF' form a block.

The source program is segmented into blocks on the basis of the plurality of branch statements and function calling statements. A branch statement and a function calling statement further exist in this block. Accordingly, the processing target program takes the hierarchical structure by combining the branch statements and the function calling statements. The block segmentation module 11 analyzes the combinations between the blocks, i.e., the hierarchical structure of the program. Then, the block segmentation module 11 expresses the hierarchical structure of the program with a data structure that can be processed in the check route generation module 12 shown in FIG. 3.

FIGS. 4–8 show data structures for expressing the hierarchical structure (the combinations of the blocks) of the source program. The block segmentation module 11 generates this data structure.

Figure 4:
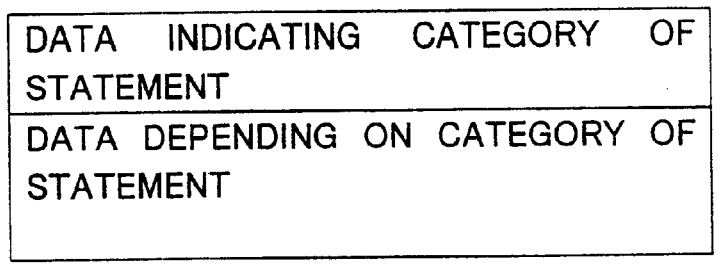
FIG. 4 is a diagram showing a statement structure.

FIG. 4 shows a statement structure. The statement structure expresses a structure of the function or the branch statement. The statement structure includes data representing a category of this statement, and data depending on this category.

Figure 5:
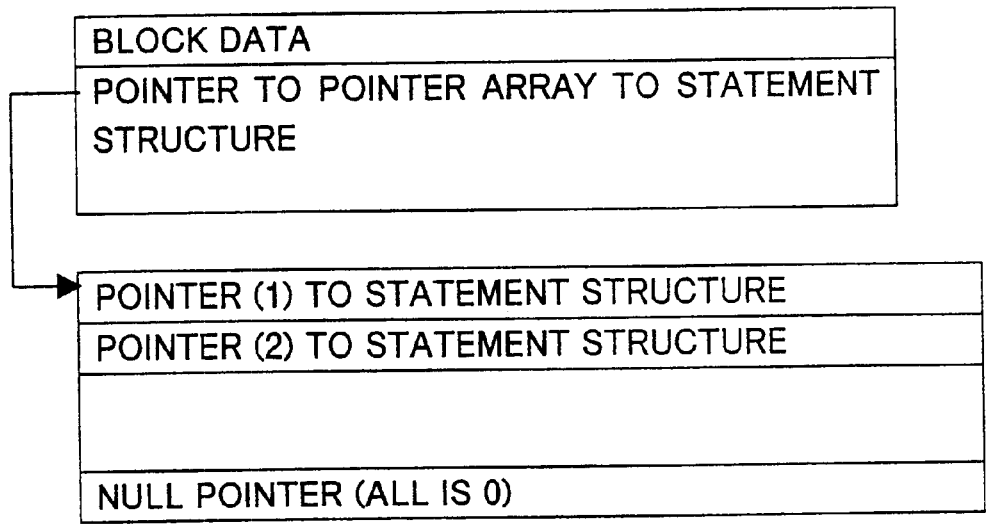
FIG. 5 is a diagram showing a block structure.

FIG. 5 shows a block structure. The block structure expresses a structure of the block of the first hierarchy which is contained in the function or the branch statement. As shown in FIG. 5, this block structure is constructed of block data and a pointer for pointing a header of a pointer array to the statement structure which indicates the branch statement or the function directly contained in that block.

FIG. 6 shows an example of the statement structure showing the function. This structure has, as shown in FIG. 6, data showing the function, a name of file in which the function is defined, a row number indicating a heading row in which that function is defined, and a pointer to the block structure of the first hierarchy in that function.

FIG. 7 shows a statement structure of a branch statement such as if(a) then {b} else {c}. Referring to FIG. 7 data indicating an if-statement shows that the branch statement expressed by this statement structure is the if-statement. The pointer to the block structure with respect to a block a is a pointer to the block structure (shown in FIG. 5) expressing the block a contained in if(a). Further, the pointer to the block structure with respect to a block b is a pointer to the block structure (shown in FIG. 5) expressing the block b contained in if (a) then {b}. The pointer to the block structure with respect to a block c is also the same.

Accordingly, if the branch statements are contained in the blocks a, b or c, the statement hierarchy is expressed by repeating the structures in FIGS. 4 and 5. Note that the programming language generally includes other control statements, e.g., the case-statement, a for-statement. Other control statements can be similarly expressed by statement structures besides what has been exemplified in FIGS. 6–8.

The hierarchical structure defined as the combinations of the blocks is expressed by the structures shown in FIGS. 4–8.

Figure 9:
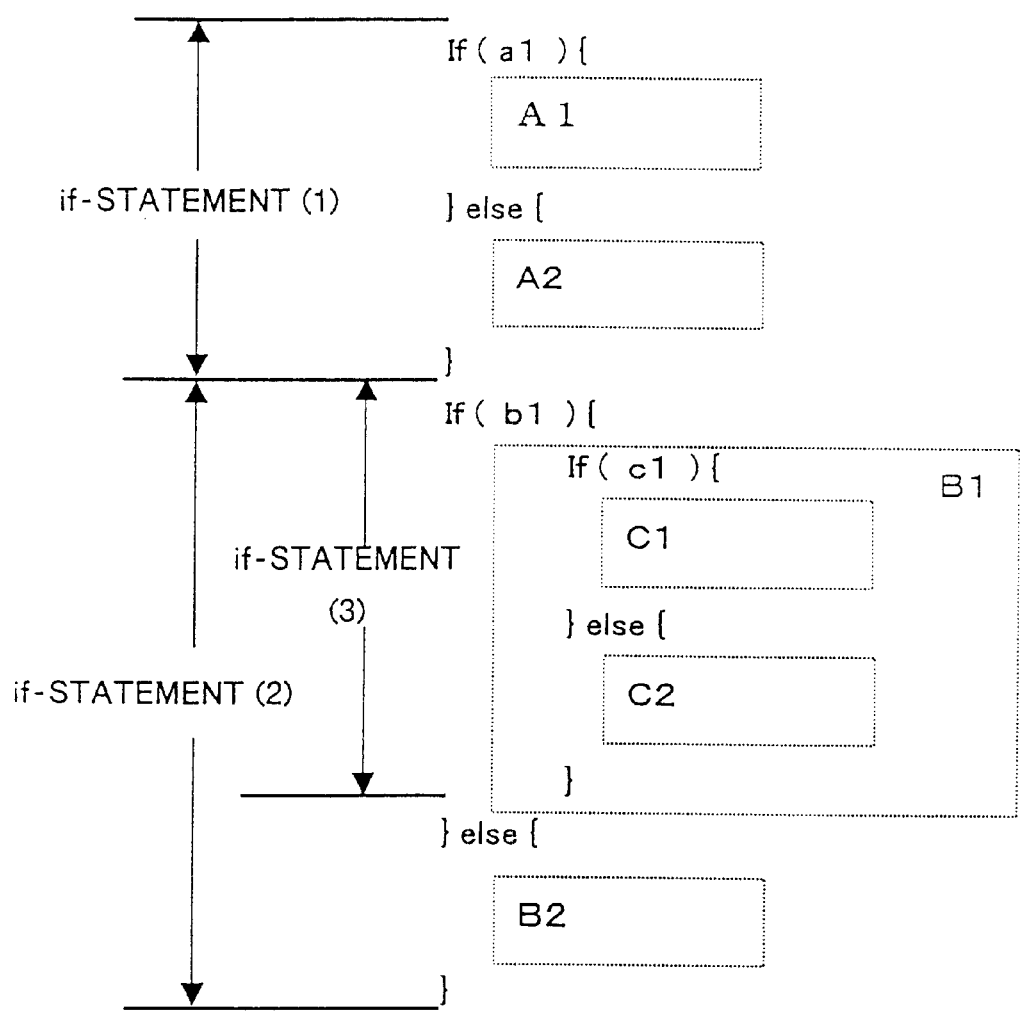
FIG. 9 is a diagram showing a sample program.
Figure 10:
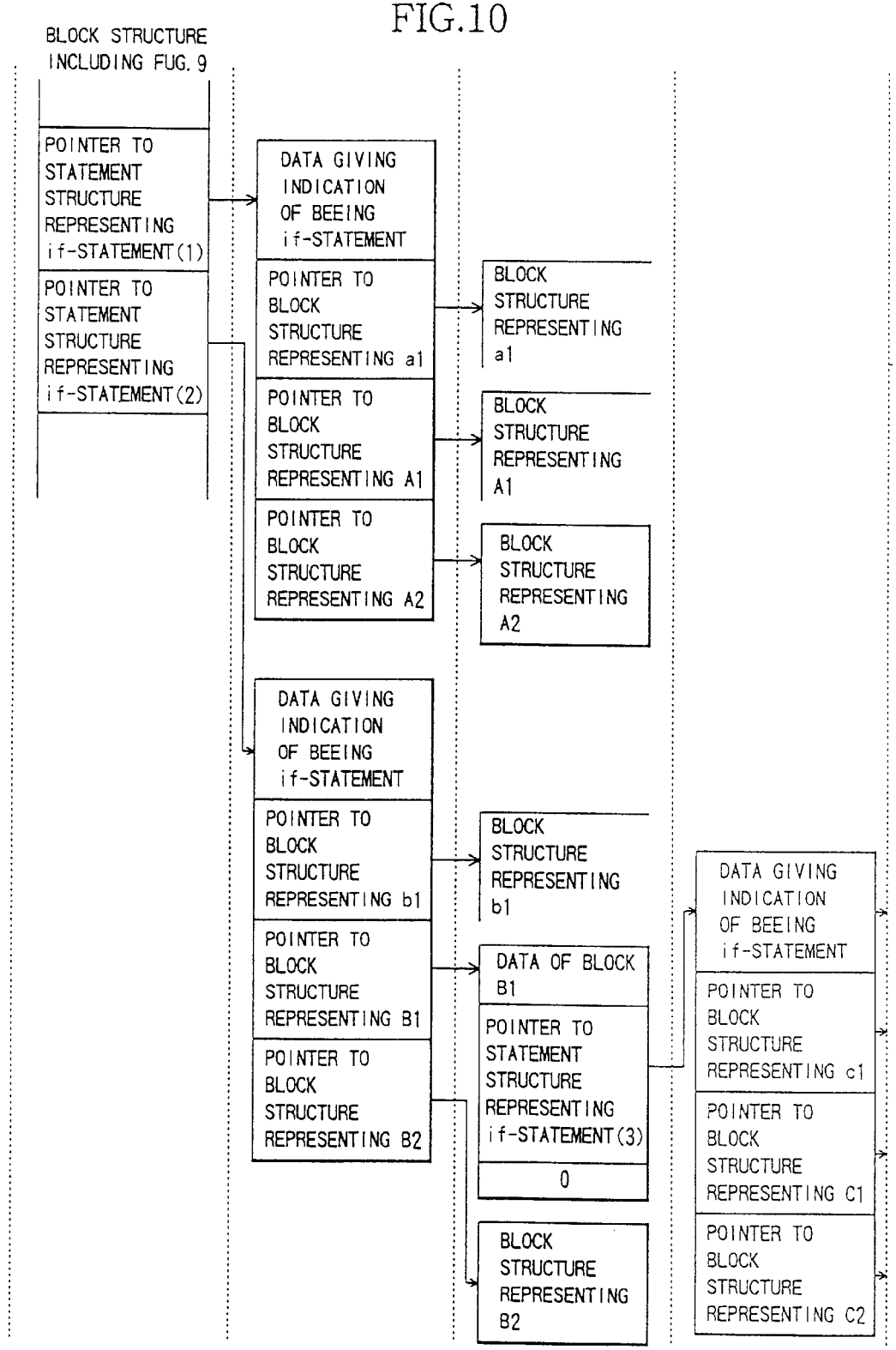
FIG. 10 is a diagram showing a hierarchical structure of the statement.

FIG. 9 shows a sample program for exemplifying the process in the block segmentation module 11. FIG. 10 shows an example of a result of what the block segmentation module 11 processes this sample program.

Processing in Check Route Generation Module

The check route generation module 12 generates the check route by making use of the program hierarchical structures (FIGS. 4–8) recognized by the block segmentation module 11. This check route is a combination of the parts (blocks) of the program of which an execution is controlled by the branch statement.

The sample program in FIG. 9 is constructed of three if-statements. A block A1 or A2 is executed depending on whether a block a1 contained in first if(a1) is true or false. Similarly, a block B1 or B2 is executed depending on whether a block b1 contained in if(b1) is true or false. Then, if the block B1 is executed, a block C1 or C2 is executed depending on a block c1 contained in if(c1) is true or false.

The check route is a list of consecutively executed statement which is obtained by combining the parts (blocks) of the program delimited by the branch statements described above. For example, if the blocks a1, b1 and c1 are all true, the respective blocks are executed such as a1=>A1=>b1= >B1 (c1=>C1) The list of such blocks is the check route.

The check route generation module 12 generates all the check routes contained in the program by combining blocks (the data structures representing the hierarchical structure shown in FIGS. 4 to 8) as shown in FIG. 10.

In accordance with this embodiment, the check route is generated based on a scan rule which will be given as below. The check route generation module 12 combines blocks by scanning a target program according to a scan rule. This scan rule is classified into a general scan rule and a specific scan rule. The general scan rule of these rules is applied without depending upon an verifying specification. Further, the specific scan rule is applied depending upon the verifying specification. It should be noted that the check route is generated for every individual function constituting the program or for the whole program constructed by combining the functions depending on designations.

General Scan Rule

The scan rule which does not depend on the verifying specification is given as follows.

(1) In one single branch statement, the block appearing earlier is given a priority, and the check route is created. For instance, in the branch statement such as if(a) then {b} else {c}, the block b is given the priority earlier than block c, and the check route is created.

(2) With respect to a plurality of branch statements existing in the same hierarchy, a coverage of all the check routes is made in variation by giving the priority to a judgement of the branch statement posterior in a description sequence.

(3) In the combinations of the branch statements extending over a plurality of hierarchies, a coverage of all the check routes is conducted in variation by giving the priority to a judgement of the branch statement existing in the deepest hierarchy.

Figure 11:
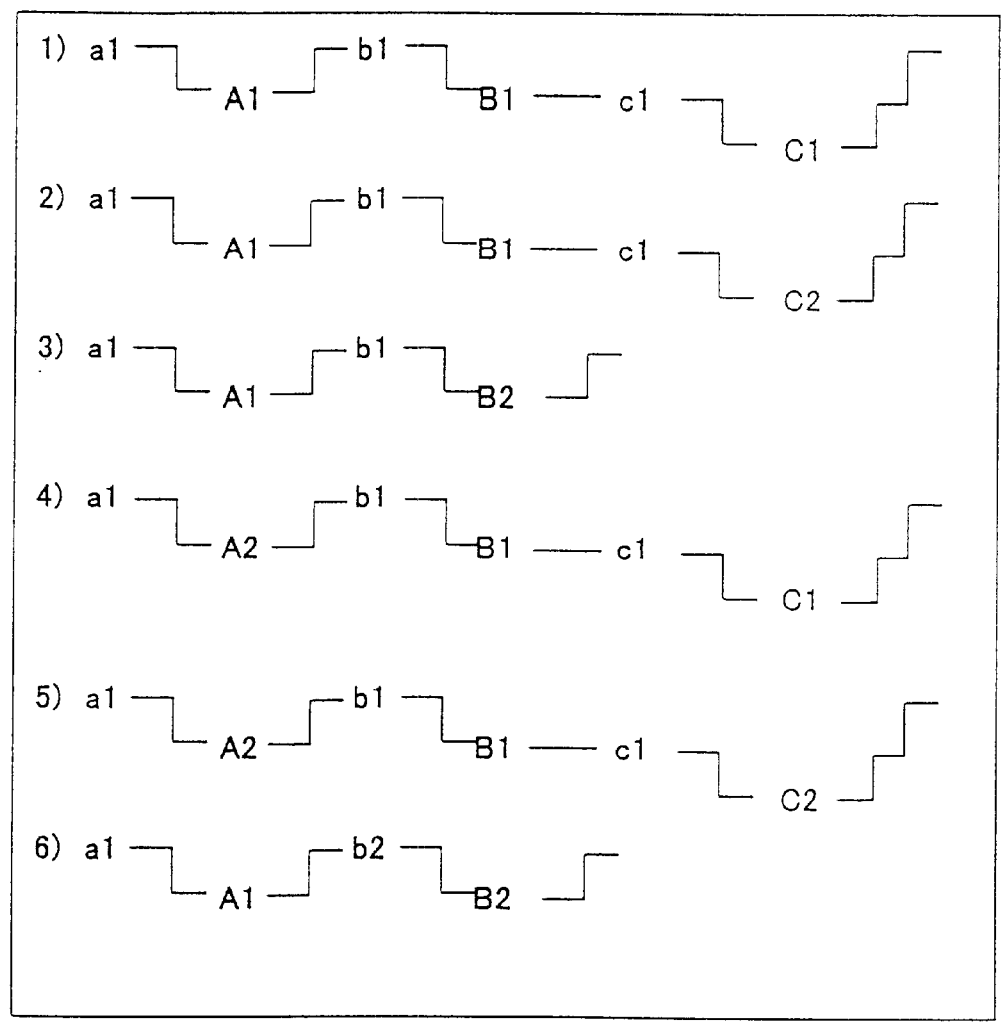
FIG. 11 is a diagram showing an example of a check route.

FIG. 11 shows the check routes generated from the sample program in FIG. 9 in accordance with the above rules. To start with, the first check route 1) is generated based on the rule (1) with the priority given to the block appearing at first. The second check route 2) is what the check route is changed from C1 to C2 by changing a judgement of if(c1) then {C1} else {C2} posterior in the description sequence and in the deepest hierarchical structure on the basis of the rules (2) and (3) described above. The subsequent check routes inclusive of 3) are generated in the same procedures.

Figure 12:
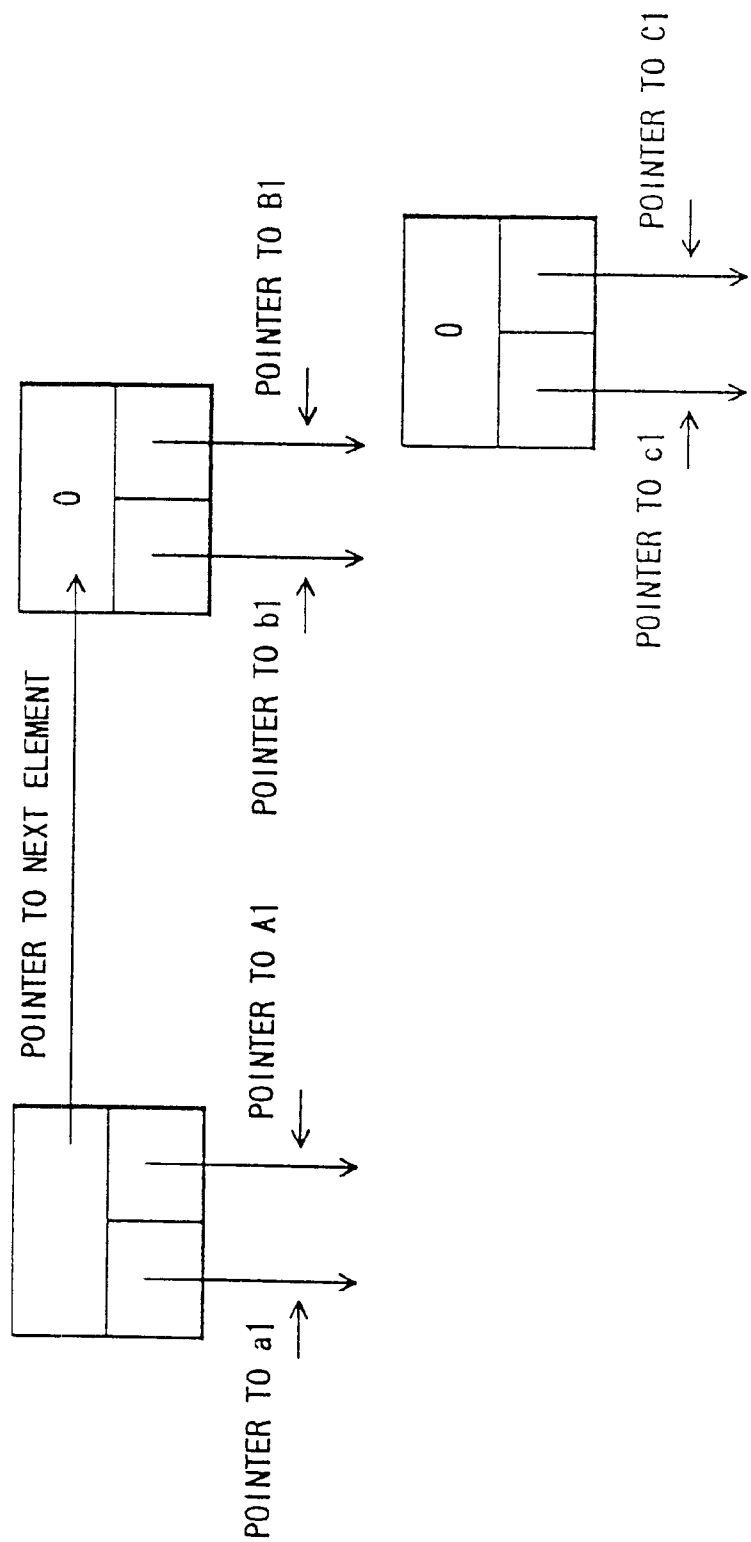
FIG. 12 is a diagram showing a data structure for expressing the check route.

FIG. 12 shows a data structure for expressing the thus generated check routes. This data structure in FIG. 12 is called a list structure. The list structure is configured by connecting a plurality of elements by pointers indicated by arrowheads. The list structure in FIG. 12 expresses the check route 1) in FIG. 11. Referring to FIG. 12, the values (which are the pointers to the blocks a1~C1 ) are retained in accordance with a1=>A1=>b1=>B1 (c1=>C1). Therefore, data about the check routes, i.e., about the combination sequence of the blocks are retained.

Specific Scan Rule

When scanning the program along the extracted check routes, a more detailed specific scan rule is needed corresponding to the verifying specification. An verifying specification 1 and a specific scan rule corresponding thereto are given as below.

The verifying specification 1: In the case of dealing with a specified program resource in one single function, a process (e.g., acquisition/release of resource) to be paired is required.

The specific scan rule:

(1) The scan starts from the heading inside the individual function. Even when calling for other function occurs, the inside of the function to be called is not scanned.

(2) If the plurality of branch statements are combined at the same level, the coverage of all the combinations is conducted, and the check route is scanned. For example, if there are a 2-branching if-statement and a 4-branching case-statement, totally (2×4=) eight check routes are scanned.

(3) With respect to loop statements (for-statement, while-statement), a loop processing part thereof is scanned only once.

(4) When detecting a break-statement within the loop, the scan exits the loop processing module.

(5) When detecting a return-statement, the scan exits the function thereof.

Processing Pattern Extraction Module and Process Specification Extraction Module The processing pattern extraction module 13 checks whether or not the processing pattern corresponding to the above verifying specification is contained in each check route. Then, the processing pattern extraction module 13 informs the process specification extraction module 14 of the detected processing pattern in every check route.

On the other hand, the process specification extraction module 14, based on the information given from the processing pattern extraction module 13, collects data about which processing pattern is contained in the respective check routes. As a result, the process specification extraction module 14 judges whether or not a process specification corresponding to the verifying specification is established. If this process specification is established in a fixed number or greater number of check routes, the process specification extraction module 14 determines this as a process specification that should be established in other check routes. Further, the process specification extraction module 14 judges that the check route with the determined process specification being unestablished is treated as a fault on the program. Then, the process specification extraction module 14 presents the check route, the unestablished process specification and a processing pattern causing the process specification unestablished. Accordingly, the process specification extraction module 14 serves as a fault checking module in this embodiment.

When the above verifying specification 1 is given as the verifying specification, there are hereinafter given processing patterns to be paired, which are extracted by the processing pattern extraction module.

Acquisition Pattern:

An processing portion in a function where a specific value is set in a variable corresponds to an acquisition pattern (It is conceived that the variable defined as a parameter of the function acquires a value at a heading of the function from a calling function).

A portion, in which the variable receives a return value of the function as a value, corresponds to the acquisition pattern.

Release Pattern:

A portion, in which the variable used as a parameter when calling the function, corresponds to a release pattern.

A portion, in which a value of the variable is stored in a control table, corresponds to the release pattern.

It is noted that the followings are examples of the process specifications corresponding to the verifying specification 1 when extracting those processing patterns.

Process specification 1: The processes for a data buffer within one single function may be processes to be paired, which correspond to the acquisition process/release process.

Process specification 2: When operating an execution level (a degree of priority compared with other programs when executing the program) within one single function, a process of raising the execution level and a process of lowering the execution level are paired and exist in this form.

Process specification 3: If exclusively controlling the resource within one function, Reserve (occupation of the resource) and Free (release of the resource) are paired and exist in this form.

Operational Example

Figure 13:
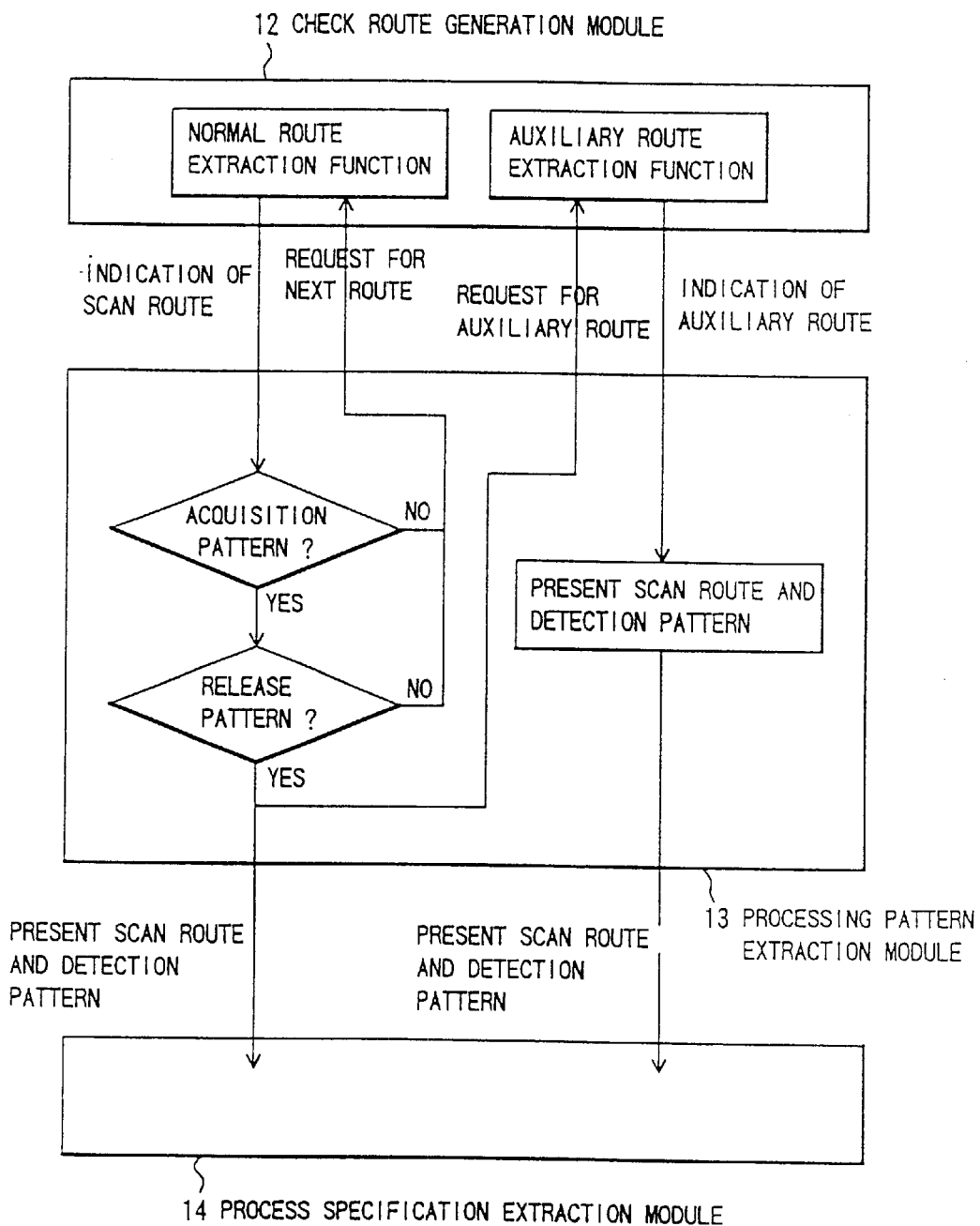
FIG. 13 is a diagram showing a relation between a check route generation module, aprocessing pattern extraction module and a process specification extraction module.

FIG. 13 shows in detail a relation between the check route generation module 12, the processing pattern generation module 13 and the process specification extraction module 14 when the verifying specification is given as the verifying specification 1.

To begin with, the check route generation module 12 indicates an check route (which is assumed to be an check route a).

Next, the processing pattern extraction module 13 examines existences of the acquisition pattern and the release pattern in this indicated check route a. Then, the processing pattern extraction module 13 informs the process specification extraction module 14 of the existence of the acquisition pattern or the release pattern.

Subsequently, the process specification extraction module 14, if an acquisition pattern a and a release pattern β exist and the verifying specification 1 is applicable, judges whether or not the release pattern β exists in all other check routes sharing the process of the acquisition pattern a with the check route a.

The operations of the check route generation module 12, the processing pattern extraction module 13 and the process specification extraction module 14, will be explained by exemplifying a sample program (program 1) shown in FIG. 14. The program 1 is a simplified program actualizing a layer of a communications protocol. The program 1 is called as functions from a low-order layer of the protocol as shown in FIG. 15. Then, the program 1 notifies a program for actualizing a high-order layer of the protocol, of the data notified from the low-order layer by calling a function such as sndmsg( ). (It actually executes an OS function). In this program 1, pointers to structure variables defined by struct buf and struct ctl are checking targets of the acquisition pattern and the release pattern. Note that the program 1 is described so that an omission of bufp release process (relbuf(bufp)) occurs in the blocks A1 and C2 for an explanatory convenience of the present invention.

FIG. 16 shows the check routes generated by the check route generation module 12 and the acquisition/release processing patterns extracted based on the verifying specification 1 from the program 1. Further, FIG. 17 shows a processing flow in the case of extracting the acquisition pattern and the release pattern.

Figure 17:
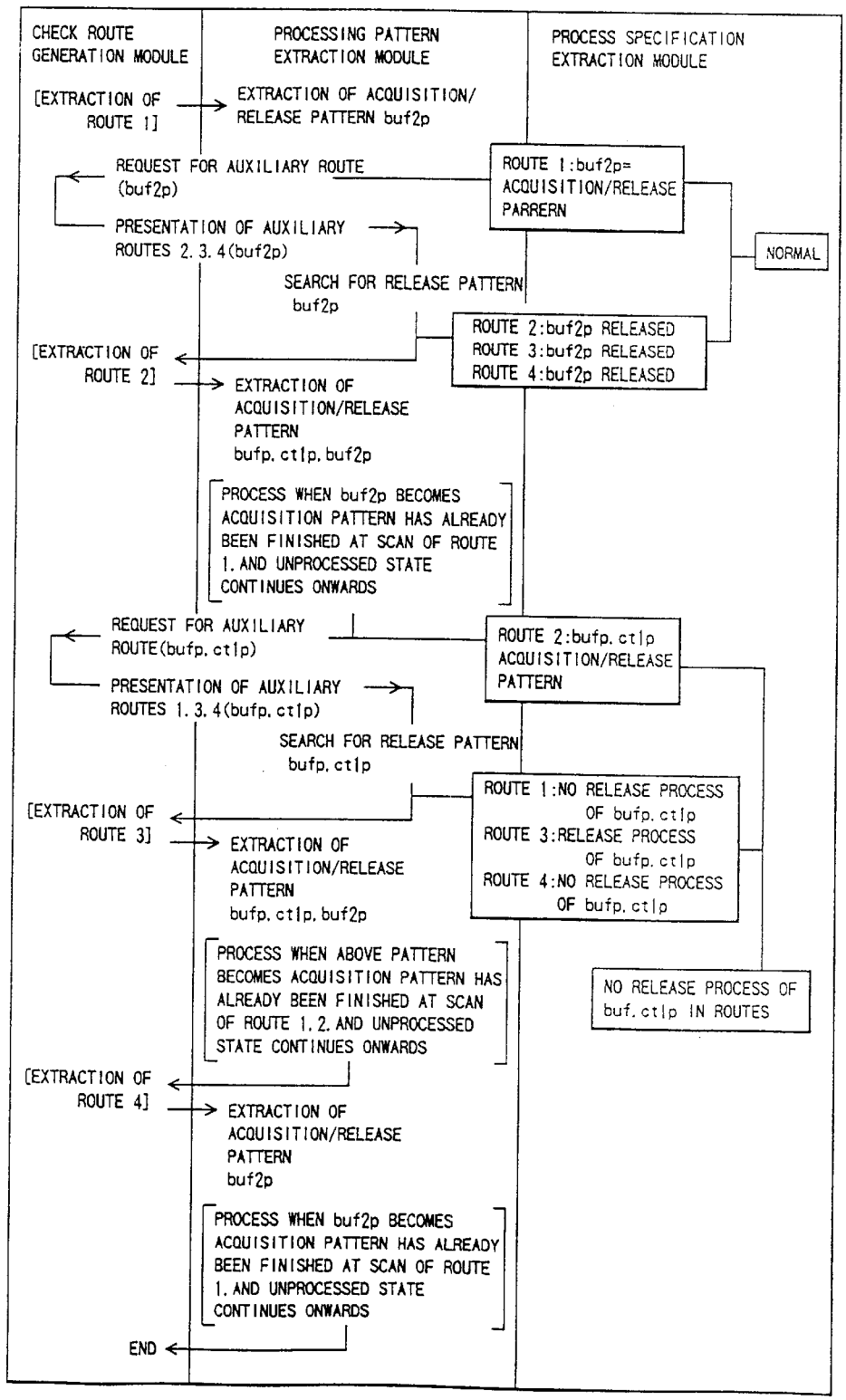
FIG. 17 is a diagram showing processes for the sample program 1.

Referring to FIG. 17, the scan starts from the route 1, i.e., a1=>A1 of the program 1. Bufp, ctlp and buf2p=getbuf( ) are detected as the acquisition patterns, and return (buf2p) is detected as the release pattern. Therefore, it is checked whether or not the release pattern exists in other check routes sharing the acquisition pattern buf2p, and the release pattern buf2p is detected in the routes 2, 3 and 4, thereby judging that the program 1 is normal.

Subsequent to the route 1, the route 2 is scanned. Acquisition and release patterns bufp, ctlp, buf2p are detected. With respect to buf2p, however, the check has already been done in the scan of the route 1, and hence, with respect to bufp and ctlp, other check routes are to be inspected. As a result, it proves that the release patterns bufp and ctlp exist neither in the route 1 nor in the route 4. The scan is performed down to the route 4 in the same way, and eventually omissions of the release processes of bufp and ctlp are detected in the route 1 and the route 4.

Now, a fault in the program 1 is only the omission of the release process of bufp in the route 1 (block A1) and the route 4 (block C2), and an assumption is that there is not release process in terms of the specification with respect to ctlp. In such a case, ctlp does not become a target for the acquisition/release process in terms of the specification, however, the fault in the case of ctlp is to be detected because of satisfying the condition of the pattern extraction rule. Such a result can be easily checked by a person confirming it afterwards. As in the case of ctlp shown in this example, however, when it is previously known that there is no necessity for the release process for a specified resource, it might be convenient if a resource ruled out of the judging target can be designated beforehand. Namely an auxiliary piece of data at the time of extracting the processing pattern is specified. If able to make such a designation, it is feasible to prevent the above futile data from being detected (which corresponds inputting information on the processes constituting a part or the whole of the process specification, as auxiliary information).

Thus, the program verifying system in the present embodiment prescribes the general rules as the check rules needed in common to a variety of programs, generates the check route corresponding to the verifying specification from the program, and judges that the particular specification corresponding to the verifying specification possessed by the program which is established in a fixed number or greater number of check routes, is the specification (process specification) established in the whole program. As a consequence, the present program verifying system provides the function of finding out the check route in which the process specification is not established, as a portion having a possibility of the fault of the program.

The program verifying system in this embodiment is capable of verifying the validity of the program based on the verifying specification defined as the general-purpose rule in terms of a program development without using a request specification unique to each individual program and complicated syntax rules.

Modified Embodiment

The embodiment discussed above has given the example where the verifying specification 1 is applied as an verifying specification to the sample program in FIG. 14. The embodiment of the present invention is not, however, limited to the verifying specification 1. An verifying specification 2 and a specific scan rule corresponding to this specification 2, are shown as below by way of an example of other verifying specification.

Verifying specification 2: A parameter (an element of the structure if the parameter is of the structure) of a function requiring the setting of a value, is preset before the function is called in whichever route on the program.

Specific scan rule:

(1) A start point (specifically, an entrance of command or what serves as an entrance of a interrupt) of the scan of the check route is designated from outside.

(2) If the plurality of branch statements are combined at the same level, a coverage of all the combinations is given, and the check route is scanned. For instance, if there are a 2-branching if-statement and a 4-branching case-statement, totally (2×4=) eight check routes are scanned.

(3) With respect to loop statements (for-statement, while-statement), a loop processing part thereof is scanned only once.

If other functions are called within the function, the check routes are scanned up to a function to be called. However, the function that has already been scanned in the scanned check route is not scanned again.

(5) When detecting a break-statement within the loop, the scan exits the loop processing module.

(6) When detecting a return-statement, the scan exits the function thereof.

When the verifying specification is given as the verifying specification 2 described above, an extracting procedure of the processing pattern extraction module is given as follows.

(1) All the functions structuring the verification target program are extracted.

(2) With respect to one function, it is analyzed how many parameters (elements of the structure if the parameters are of the structure) are set when calling the function in a function calling position in all the routes generated based on the specific scan rule.

As a result of the above scan, it is investigated that the parameters set before calling the function are coincident in a fixed number or greater number of check routes with respect to each function. When parameters are set in a fixed number or greater number of check routes, it is judged that the setting of the parameters is needed before calling the function.

In the embodiment discussed above, the verification target is the source program. The embodiment of the present invention is not, however, confined to the verification of the source program. Namely, the present invention can be generally applied to programs in which the check routes and the processing patterns contained in those check routes can be found out. Accordingly, the present invention does not depend upon whether the format of the processing target program is a text format as in the case of the source program or a compiled binary format. For example, in the embodiment discussed above, the statement is replaced with a command, the block is replaced with a train of commands, and the row number in FIG. 4 is changed to a file address. With these modifications, the present invention can be applied directly to the program in the binary format.

Readable-by-Computer Recording Medium

The program executed by the CPU 1 in this embodiment can be recorded on a recording medium readable by a computer. Then, the computer reads and executes this program, and is thereby made to function as the program verifying system exemplified in this embodiment.

Herein, the readable-by-computer recording medium may embrace recording mediums capable of electrically, magnetically, optically, mechanically or chemically storing information such as data, programs, etc., which can be read by the computer. Among those recording mediums, for example, a floppy disk, a magneto-optic disk, a CD-ROM, a CD-R/W, a DVD, and 8 mm tape, memory card, etc. are a type of being demountable from the computer.

Further, the recording mediums fixed inside the computer are exemplified by a hard disk, a ROM (Read Only Memory), etc.

Data Signal Embodied in Carrier Wave

Moreover, the program given above may be stored in the hard disk and the memory of the computer, and downloaded to other computer via communication media. In this case, the program is transmitted as data signals embodied in carrier waves via the communication media. Then, the computer downloaded with this program can be made to function as the program verifying system in this embodiment.

Herein, the communication media may be any one of cable communication mediums (such as metallic cables including a coaxial cable and a twisted pair cable, or optical communication cables), and wireless communication media (such as satellite communications, ground wave wireless communications, etc.).

Further, the carrier waves are electromagnetic waves or light for modulating the data signals. The carrier waves may be, however, DC signals (in this case, the data signal takes a base band waveform with no carrier wave) Accordingly, the data signal embodied in the carrier wave may be any one of a modulated broadband signal and an unmodulated base band signal (corresponding to a case where a DC signal having a voltage of 0 is set as a carrier wave).

What is claimed is:

1. A method of verifying an execution program executed by a computer or a source program for generating the execution program, said method comprising:

an operation of segmenting the execution program or the source program into blocks each consisting of one or more processes and defined as a part of the program, which correspond to a verifying specification for verifying the program;

an operation of generating a plurality of combinations of the two or more blocks as a check route corresponding to the verifying specification; and an operation of extracting the processes corresponding to the verifying specification executed in a predetermined number or greater number of check routes, as a process specification that should be executed also in other check routes.

2. A method of verifying an execution program or a source program according to claim 1, further comprising an operation of detecting a fault of the program by inspecting a check route in which the processes extracted as the process specification are not executed.

3. A method of verifying an execution program or a source program according to claim 1, further comprising an operation of displaying the blocks, the check routes and the processes extracted as the process specification or the processes which are not extracted as the process specification.

4. A method of verifying an execution program or a source program according to claim 1, further comprising an operation of inputting information on the processes constituting a part or the whole of the process specification, as auxiliary information.

5. A system for verifying an execution program executed by a computer or a source program for generating the execution program, said system comprising:

a block segmentation module for segmenting the execution program or the source program into blocks each consisting of one or more processes and defined as a part of the program, which correspond to a verifying specification for verifying the program;

a check route generation module for generating a plurality of combinations of the two or more blocks as a check route corresponding to the verifying specification; and a process specification extraction module for extracting the processes corresponding to the verifying specification executed in a predetermined number or greater number of check routes, as a process specification that should be executed also in other check routes.

6. A system for verifying an execution program or a source program according to claim 5, further comprising a fault detection module for detecting a fault of the program by inspecting a check route in which the processes extracted as the process specification are not executed.

7. A system for verifying an execution program or a source program according to claim 5, further comprising display means for displaying the blocks, the check routes and the processes extracted as the process specification or the processes which are not extracted as the process specification.

8. A system for verifying an execution program or a source program according to claim 5, further comprising input means for inputting information on the processes constituting a part or the whole of the process specification, as auxiliary information.

9. A readable-by-computer recording medium recorded with a program, for making a computer verify an execution program executed by a computer or a source program for generating the execution program, comprising:

an operation of segmenting the execution program or the source program into blocks each consisting of one or more processes and defined as a part of the program, which correspond to a verifying specification for verifying the program;

an operation of generating a plurality of combinations of the two or more blocks as a check route corresponding to the verifying specification; and an operation of extracting the processes corresponding to the verifying specification executed in a predetermined number or greater number of check routes, as a process specification that should be executed also in other check routes.

* * * * *

UNITED STATES PATENT AND TRADEMARK OFFICE
CERTIFICATE OF CORRECTION

PATENT NO. : 6,697,965 B1
DATED : February 24, 2004
INVENTOR(S) : Fumio Shimada

It is certified that error appears in the above-identified patent and that said Letters Patent is hereby corrected as shown below:

Title page,
Item [30], Foreign Application Priority Data, please delete "July 10, 1999" and insert -- October 7, 1999 --

Signed and Sealed this

Thirtieth Day of November, 2004

JON W. DUDAS
*Director of the United States Patent and Trademark Office*